US010853432B2

(12) United States Patent
Su et al.

(10) Patent No.: US 10,853,432 B2
(45) Date of Patent: Dec. 1, 2020

(54) METHODS AND SYSTEMS FOR GENERATING SEARCH RESULTS AND RECOMMENDATIONS BASED ON MULTI-SOURCED TWO-WAY CORRESPONDENCE AND RELATIVE ENTITY PROMINENCE

(71) Applicant: Google LLC, Mountain View, CA (US)

(72) Inventors: Jennifer Su, San Francisco, CA (US); Christian Posse, Belmont, CA (US)

(73) Assignee: Google LLC, Mountain View, CA (US)

( * ) Notice: Subject to any disclaimer, the term of this patent is extended or adjusted under 35 U.S.C. 154(b) by 222 days.

(21) Appl. No.: 15/893,604

(22) Filed: Feb. 10, 2018

(65) Prior Publication Data

US 2019/0251205 A1 Aug. 15, 2019

(51) Int. Cl.
*G06F 16/00* (2019.01)
*G06F 16/9535* (2019.01)
*G06N 20/00* (2019.01)
*G06F 16/2457* (2019.01)

(52) U.S. Cl.
CPC .... *G06F 16/9535* (2019.01); *G06F 16/24578* (2019.01); *G06N 20/00* (2019.01)

(58) Field of Classification Search
CPC .......... G06F 16/24578; G06F 16/9535; G06N 20/00; G06Q 10/105; G06Q 50/16
USPC ........................................................ 707/728
See application file for complete search history.

(56) References Cited

U.S. PATENT DOCUMENTS

| | | | | |
|---|---|---|---|---|
| 8,925,099 B1* | 12/2014 | Saxe | ................... | G06F 21/6245 713/187 |
| 2001/0039508 A1* | 11/2001 | Nagler | ........... | G06Q 10/063112 705/7.14 |
| 2002/0038280 A1* | 3/2002 | Levy | ...................... | G06Q 40/02 705/37 |
| 2007/0136178 A1* | 6/2007 | Wiseman | ............... | G06Q 30/02 705/37 |
| 2007/0203852 A1* | 8/2007 | Cameron | ............... | G06Q 30/06 705/75 |
| 2008/0005223 A1* | 1/2008 | Flake | .................... | G06F 16/951 709/203 |
| 2008/0109245 A1* | 5/2008 | Gupta | ................... | G06Q 10/00 705/1.1 |

(Continued)

OTHER PUBLICATIONS

Li et al., "How to Get Them a Dream Job? Entity-Aware Features for Personalized Job Search Ranking", International Conference on Knowledge Discovery and Data Mining, San Francisco, California, Aug. 13-17, 2016, pp. 501-510.

*Primary Examiner* — Vincent F Boccio
(74) *Attorney, Agent, or Firm* — Dority & Manning, PA

(57) ABSTRACT

The present disclosure is directed to generating search results, recommendations, and/or the like. In particular, the methods and systems of the present disclosure can: receive data describing one or more aspects of entities of different types; determine, based at least in part on the aspect(s) of the entities, one or more additional aspects of the entities; determine, based at least in part on the additional aspect(s) of the entities, a metric indicating an extent to which the entities correspond to one another; generate, based on the metric, one or more search results, recommendations, and/or the like; and communicate, to a computing device (e.g., for display, and/or the like), data indicating the search result(s), recommendation(s), and/or the like.

19 Claims, 10 Drawing Sheets

(56) References Cited

U.S. PATENT DOCUMENTS

2010/0306249 A1* 12/2010 Hill .................. G06Q 30/02
       707/769
2014/0279568 A1* 9/2014 Cotsikis ............ G06Q 50/188
       705/80

* cited by examiner

| Privacy Settings for Listing | | | |
|---|---|---|---|
| | Listing | Aspects Identified Based on Listing | Aspects Identified Based on User Activity |
| Inside My Organization | ◉ | ◉ | ◉ |
| Registered Organizations | ◉ | ◉ | ◉ |
| Registered Applicants | ◉ | ◉ | ○ |
| Public Users | ◉ | ○ | ○ |

Privacy Settings for Applicant Profile

| | Profile | Aspects Identified Based on Profile | Aspects Identified Based on User Activity |
|---|---|---|---|
| Inside My Organization | ○ | ○ | ○ |
| Registered Organizations | ● | ● | ● |
| Registered Applicants | ○ | ● | ● |
| Public Users | ○ | ○ | ○ |

METHODS AND SYSTEMS FOR GENERATING SEARCH RESULTS AND RECOMMENDATIONS BASED ON MULTI-SOURCED TWO-WAY CORRESPONDENCE AND RELATIVE ENTITY PROMINENCE

FIELD

The present disclosure relates generally to generating search results and recommendations. More particularly, the present disclosure relates to generating search results and recommendations based on multi-sourced two-way correspondence and relative entity prominence.

BACKGROUND

Computers are increasingly storing and organizing ever larger quantities of data. One way of accessing or browsing such data is to generate search results, recommendations, and/or the like, for example, based on search criteria provided by a user. Computers can generate search results, recommendations, and/or the like by comparing data provided by a user (e.g., search criteria, and/or the like) with stored data to identify matching, corresponding, and/or the like data, for example, for presentation to the user. Generating search results, recommendations, and/or the like often involves comparing explicit aspects of the data; however, such a limited approach can ignore interrelationships, correspondence, and/or the like amongst the data that exists beyond the explicit aspects of the data.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include receiving, by a computing system and from a computing device associated with an entity of a first type, data describing one or more aspects of the entity of the first type. The method can also include receiving, by the computing system and from a computing device associated with an entity of a second type, data describing one or more aspects of the entity of the second type, the first type being different from the second type, the entity of the first type seeking entities of the second type, and the entity of the second type seeking entities of the first type. The method can further include determining, by the computing system and based at least in part on the one or more aspects of the entity of the first type and data associated with the entity of the first type and retrieved from a computing device distinct from the computing device associated with the entity of the first type, one or more additional aspects of the entity of the first type. The method can further include determining, by the computing system and based at least in part on the one or more aspects of the entity of the second type and data associated with the entity of the second type and retrieved from a computing device distinct from the computing device associated with the entity of the second type, one or more additional aspects of the entity of the second type. The method can further include determining, by the computing system and based at last in part on the one or more additional aspects of the entity of the first type and the one or more additional aspects of the entity of the second type, a metric indicating an extent to which the entity of the first type and the entity of the second type correspond to one another. The method can further include generating, by the computing system and based at least in part on the metric, one or more of search results or recommendations identifying the entity of the first type. The method can further include communicating, by the computing system and to the computing device associated with the entity of the second type, data indicating the one or more of the search results or the recommendations.

Another example aspect of the present disclosure is directed to a system. The system can include one or more processors and a memory storing instructions that when executed by the one or more processors cause the system to perform operations. The operations can include receiving, from a computing device associated with an entity of a first type, data describing one or more aspects of the entity of the first type. The operations can also include determining, based at least in part on the one or more aspects of the entity of the first type and data associated with the entity of the first type and retrieved from a computing device distinct from the computing device associated with the entity of the first type, one or more additional aspects of the entity of the first type. The operations can further include determining, based at last in part on the one or more additional aspects of the entity of the first type, a plurality of metrics indicating extents to which the entity of the first type corresponds with a plurality of different entities of a second type. The operations can further include generating a listing of one or more of search results or recommendations identifying the plurality of different entities of the second type and ordered based at least in part on the plurality of metrics. The operations can further include communicating, to the computing device associated with the entity of the first type, data indicating the listing.

A further example aspect of the present disclosure is directed to one or more non-transitory computer-readable media. The one or more non-transitory computer-readable media can comprise instructions that when executed by one or more computers cause the one or more computers to perform operations. The operations can include, for each entity of a first type of a plurality of different entities of a first type: receiving, from a computing device associated with the entity of the first type, data describing one or more aspects of the entity of the first type; determining, based at least in part on the one or more aspects of the entity of the first type and data associated with the entity of the first type and retrieved from a computing device distinct from the computing device associated with the entity of the first type, one or more additional aspects of the entity of the first type; determining, based at last in part on the one or more additional aspects of the entity of the first type, a plurality of metrics indicating extents to which the entity of the first type corresponds with a plurality of different entities of a second type; generating, based at least in part on the plurality of metrics, one or more of search results or recommendations identifying the plurality of different entities of the second type; and communicating, to the computing device associated with the entity of the first type, data indicating the one or more of the search results or the recommendations.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIGS. 3A and 3B depict example interfaces according to example embodiments of the present disclosure.

DETAILED DESCRIPTION

Figure 1:
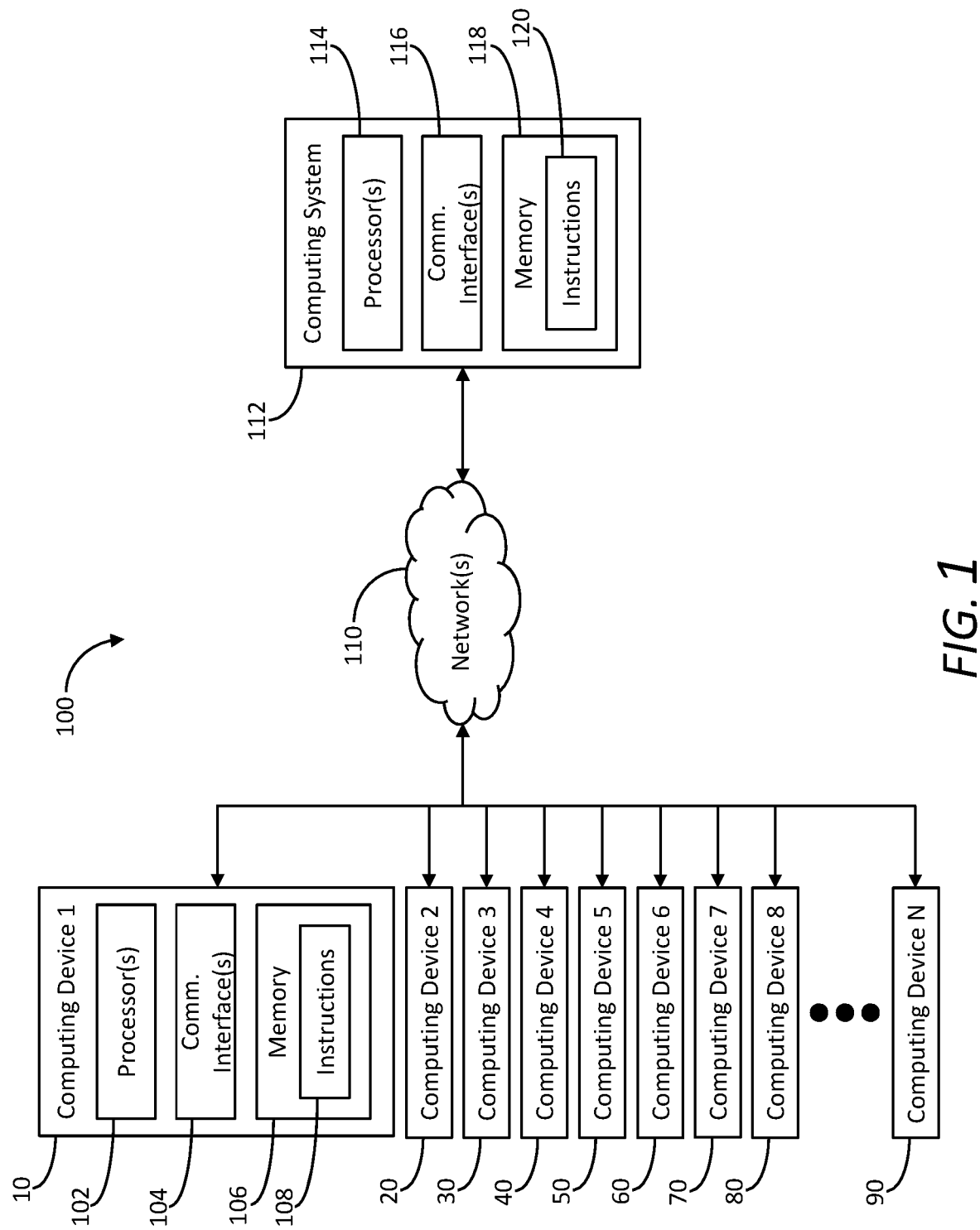
FIG. 1 depicts an example computing environment according to example embodiments of the present disclosure.

Example aspects of the present disclosure are directed to generating search results, recommendations, and/or the like. In particular, a computing system can generate one or more search results, recommendations, and/or the like based at least in part on a metric indicating a reputational prominence of an entity (e.g., an entity corresponding to search criteria, the recommendation(s), and/or the like) relative to multiple other entities of a similar type. For example, the entity can be an organization (e.g., business, company, corporation, non-profit, and/or the like), and the metric can indicate a reputational prominence (e.g., popularity, prestige, and/or the like) of the organization relative to other organizations (e.g., in a similar market, having a similar purpose, located in the same geographic area, and/or the like). Additionally or alternatively, the computing system can generate the search result(s), recommendation(s), and/or the like based at least in part on a metric indicating an extent to which entities of different types (e.g., entities corresponding to search criteria, the recommendation(s), and/or the like) correspond to one another. For example, one of the entities can be a job applicant (e.g., an individual or organization seeking employment, and/or the like), the other entity can be a job listing (e.g., associated with an organization seeking to employ an individual, other organization, and/or the like), and the metric can indicate how appealing the entities are to one another (e.g., a measure of their two-way correspondence, appeal, and/or the like). Additionally or alternatively, the entities can be a prospective buyer and a real-estate listing, a prospective client and a professional-service provider, and/or the like.

For each entity, the computing system can receive (e.g., from a computing device associated with the entity, and/or the like) data describing one or more aspects of the entity. The computing system can determine, for example, based on the data describing the aspect(s) of the entity, one or more additional aspects of the entity. The computing system can determine such additional aspect(s), for example, by utilizing an element of the data describing the aspect(s) to identify (e.g., in data associated with the entity, retrieved from a computing device distinct from a computing device from which the data describing the aspect(s) of the entity was received, and/or the like) data indicating one or more of the additional aspect(s). For example, the entity can be a job listing, the computing system can receive (e.g., from a computing device associated with the hiring organization, and/or the like) data indicating the name of the hiring organization, the title of the hiring manager, and/or the like, and the computing system can utilize elements from the received data (e.g., the name of the hiring organization, the title of the hiring manager, and/or the like) to identify (e.g., in data retrieved from a computing device storing biographical information about organizations' management, and/or the like) data indicating an additional aspect of the job listing (e.g., the name of the hiring manager, and/or the like).

The computing system can further determine, for example, based on the data indicating the additional aspect (s), one or more further additional aspects of the entity. For example, the computing system can utilize the data indicating the additional aspect of the job listing (e.g., the name of the hiring manager, and/or the like) to identify (e.g., in data retrieved from a computing device storing professional networking information, and/or the like) data indicating a further additional aspect of the job listing (e.g., the name of an organization at which the hiring manager was previously employed, and/or the like).

The computing system can perform such determinations for entities of each type. For example, for a job applicant, the computing system can receive (e.g., from a computing device associated with the job applicant, and/or the like) data indicating the name of the job applicant, the name of an organization at which the job applicant is currently employed, and/or the like, and the computing system can utilize elements from the received data (e.g., the name of the job applicant, the name of the organization at which the job applicant is currently employed, and/or the like) to identify (e.g., in data retrieved from the computing device storing biographical information about organizations' management, and/or the like) data indicating an additional aspect of the job applicant (e.g., the name of the current manager of the job applicant, and/or the like). Similarly, the computing system can further determine, for example, based on the data indicating the additional aspect(s), one or more further additional aspects of the job applicant. For example, the computing system can utilize the data indicating the additional aspect of the job applicant (e.g., the name of the current manager of the job applicant, and/or the like) to identify (e.g., in data retrieved from the computing device storing professional networking information, and/or the like) data indicating a further additional aspect of the job applicant (e.g., the name of an organization at which the current manager of the job applicant was previously employed, and/or the like).

In some embodiments, the computing system can make such determinations based on data retrieved, determined, and/or the like by the computing system. For example, in the job applicant and/or listing context, such data can include professional and/or social networking information, employment history, job titles, descriptions, publication dates, the number of job listings associated with an entity, the number of employees associated with an entity, revenue and/or funding information associated with an entity, previous hiring information, the total number of applicants, time to hire, information associated with previously hired applicants, previous job descriptions, hiring managers, recruiters, and/or the like.

The computing system can determine, for example, based on the determined aspect(s), a metric indicating a reputational prominence of one of the entities relative to multiple other entities of a similar type. For example, the computing system can determine (e.g., based on a reputation of the organization at which the hiring manager was previously employed, and/or the like) that the job listing is of relatively high reputational prominence compared with one or more other similar job listings. Additionally or alternatively, the computing system can determine, for example, based on the determined aspect(s), a metric indicating an extent to which entities of different types correspond to one another. For example, the computing system can determine (e.g., based on matching the organization at which the hiring manager was previously employed with the organization at which the current manager of the job applicant was previously employed, and/or the like) that the applicant and the job listing are appealing to one another.

In some embodiments, the computing system can determine the metric indicating the extent to which entities of different types correspond to one another based on a determined metric indicating a reputational prominence of one of the entities relative to multiple other entities of a similar type. For example, the computing system can determine that the applicant and the job listing are appealing to one another based on the determination that the job listing is of relatively high reputational prominence compared with other similar job listing(s), a determination that the job applicant is of relatively high reputational prominence compared with one or more other similar job applicants, and/or the like.

In some embodiments, the computing system can utilize a machine-learning model to determine the metric indicating the extent to which the entities of different types correspond to one another. In some of such embodiments, the machine-learning model can be based at least in part on extents to which various different entities of one of the types (e.g., entities associated with one or more of the determined aspect(s) of the entity of that type, and/or the like) have corresponded with various different entities of the other type (e.g., entities associated with one or more of the determined aspect(s) of the entity of the other type, and/or the like).

The computing system can generate, for example, based on the determined metric(s), one or more search results, recommendations, and/or the like and can communicate data indicating the search result(s), recommendation(s), and/or the like to a computing device (e.g., for display to a user, and/or the like).

In some embodiments, the computing system can determine multiple metrics, for example, indicating reputational prominences of entities relative to multiple other entities of a similar type, indicating extents to which entities of different types correspond to one another, and/or the like. In some of such embodiments, the computing system can generate a listing of the search result(s), recommendation(s), and/or the like ordered based on the determined metrics. For example, the computing system can generate: for a job applicant, a listing of search result(s), recommendation(s), and/or the like identifying job listings ordered based on their reputational prominences, extents to which they correspond with the job applicant, and/or the like; and/or for a job listing, a listing of search result(s), recommendation(s), and/or the like identifying job applicants ordered based on their reputational prominences, extents to which they correspond with the job listing, and/or the like.

In some embodiments, the computing system can determine one or more interactions between the entities. The interaction(s) can include, for example, one or more click-through rates. Such click-through rate(s) can be associated with an entity of one type with respect to an entity of another type. For example, a click-through rate can be associated with one or more job applicants with respect to a job listing, one or more job listings with respect to a job applicant, and/or the like. In some of such embodiments, the computing system can determine one or more of the metric(s) based on the interaction(s) (e.g., the click-through rate(s), and/or the like). Additionally or alternatively, one or more of the interaction(s) can occur subsequent to determining the metric(s), and subsequent to such interaction(s), the computing system can determine one or more updated metrics. The computing system can generate, for example, based on the updated metric(s), one or more new search results, recommendations, and/or the like and can communicate data indicating the new search result(s), recommendation(s), and/or the like to a computing device (e.g., for display to a user, and/or the like).

In some embodiments, a user (e.g., associated with an entity, and/or the like) can be provided with controls allowing the user to make one or more elections as to if and/or when systems, programs, features, and/or the like described herein can enable collection of user information, whether the user is sent content, communications, and/or the like. Additionally or alternatively, certain data may be treated in one or more ways before it is stored, used, and/or the like, for example, so that personally identifiable information is removed. For example, a user's identity can be treated so that no personally identifiable information can be determined for the user, a user's geographic location may be generalized where location information is obtained (e.g., such as to a city, ZIP code, state level, and/or the like), so that a particular location of a user cannot be determined, and/or the like. Thus, a user can have control over what information is collected about the user, how that information is used, what information is provided to the user, and/or the like.

The methods and systems described herein can provide a number of technical effects and benefits. For example, the methods and systems described herein can leverage data from multiple sources to generate one or more search results, recommendations, and/or the like based at least in part on relative reputational prominences of similar entities, extents to which entities of different types correspond to one another, and/or the like, thereby providing a multi-layer solution, and/or the like. Such search result(s), recommendation(s), and/or the like can be more relevant to a user because they can be based on implicit dimensions, for example, aspects of the entities, relationships between entities, and/or the like not explicitly provided by users associated with the entities (e.g., as part of search criteria, and/or the like).

In the context of matching job applicants with job listings, such implicit dimensions can include dimensions from the applicants' perspective (e.g., prestige of hiring entity, likelihood of being hired, temporal factors (e.g., a listing that has been open for a relatively long period could imply a difficult or highly competitive process, and/or the like), attractiveness of the job within the geographic area, and/or the like) and dimensions from the listings' perspective (e.g., excitement of the applicant, competiveness of the market for qualified talent, supply of qualified talent within the geographic area, likelihood of receiving an application, recommendation from current or former employers, and/or the like, likelihood of hiring the applicant, and/or the like).

As an additional example technical effect and benefit, by matching entities more quickly and efficiently, the amount of computing resources dedicated or otherwise required to host, advertise, or otherwise make available listings seeking a match of entities can be reduced. As one example, by providing improved matching of job applicants to job listings across a large corpus of listings, applicants, and/or the like, the number of outstanding listings, applicants, and/or the like can be reduced as listings, applicants, and/or the like are more efficiently matched. Therefore, the processing and memory resources required for handling the corpus of job listings, applicants, and/or the like can be reduced. For example, the number of processor cycles required for processing can be reduced, energy utilized by data centers performing the processing can be reduced, redundant and/or additional processing (e.g., associated with searches, and/or the like) can be obviated, reduced, and/or the like, thereby further reducing associated resource consumption, and/or the like.

As described herein, search result(s), recommendation(s), and/or the like can be generated, updated, and/or the like based on prior and/or ongoing interactions associated with the entities (e.g., leveraging the "wisdom of the crowd," and/or the like). The methods and systems described herein can holistically observe entities and generate dynamically adjusted search result(s), recommendation(s), and/or the like based on one or more determined trends (e.g., from a financial or news perspective, and/or the like). In some embodiments, the methods and systems can dynamically update the search result(s), recommendation(s), and/or the like in realtime. The metrics described herein can be utilized: to determine information about an outlook of an entity, brand value, fit within a niche market, net promoter scores, and/or the like; as a proxy for predicting entity performance, estimating entity worth, determining a valuation of an entity, forecasting stock performance, and/or the like; to guide market research of an entity, product pricing for an entity, urban planning for a location associated with an entity, and/or the like.

With reference now to the Figures, example embodiments of the present disclosure will be discussed in further detail.

FIG. 1 depicts an example computing environment according to example embodiments of the present disclosure. Referring to FIG. 1, environment 100 can include one or more computing devices (e.g., one or more desktop computers, laptop computers, tablet computers, mobile devices, smartphones, servers, and/or the like). For example, environment 100 can include computing devices 10, 20, 30, 40, 50, 60, 70, 80, and 90 and computing system 112. Environment 100 can also include one or more networks 110 (e.g., one or more wired networks, wireless networks, and/or the like). Network(s) 110 can interface computing devices 10, 20, 30, 40, 50, 60, 70, 80, and/or 90 with one another and/or with computing system 112.

Computing device 10 can include one or more processor(s) 102, one or more communication interfaces 104, and memory 106 (e.g., one or more hardware components for storing executable instructions, data, and/or the like). Communication interface(s) 104 can enable computing device 10 to communicate with computing devices 20, 30, 40, 50, 60, 70, 80, and/or 90 and/or with computing system 112. Memory 106 can include (e.g., store, and/or the like) instructions 108. When executed by processor(s) 102, instructions 108 can cause computing device 10 to perform one or more operations, functions, and/or the like described herein. It will be appreciated that computing devices 20, 30, 40, 50, 60, 70, 80, and/or 90 can include one or more of the components described above with respect to computing device 10.

Computing system 112 can include one or more processor(s) 114, one or more communication interfaces 116, and memory 118 (e.g., one or more hardware components for storing executable instructions, data, and/or the like). Communication interface(s) 116 can enable computing system 112 to communicate with computing devices 10, 20, 30, 40, 50, 60, 70, 80, and/or 90. Memory 118 can include (e.g., store, and/or the like) instructions 120. When executed by processor(s) 114, instructions 120 can cause computing system 112 to perform one or more operations, functions, and/or the like described herein.

Unless explicitly indicated otherwise, the operations, functions, and/or the like described herein can be performed by computing devices 10, 20, 30, 40, 50, 60, 70, 80, and/or 90 and/or computing system 112 (e.g., by computing device 10, 20, 30, 40, 50, 60, 70, 80, or 90, by computing system 112, by a combination of computing devices 10, 20, 30, 40, 50, 60, 70, 80, and/or 90 and/or computing system 112, and/or the like).

Figure 2A:
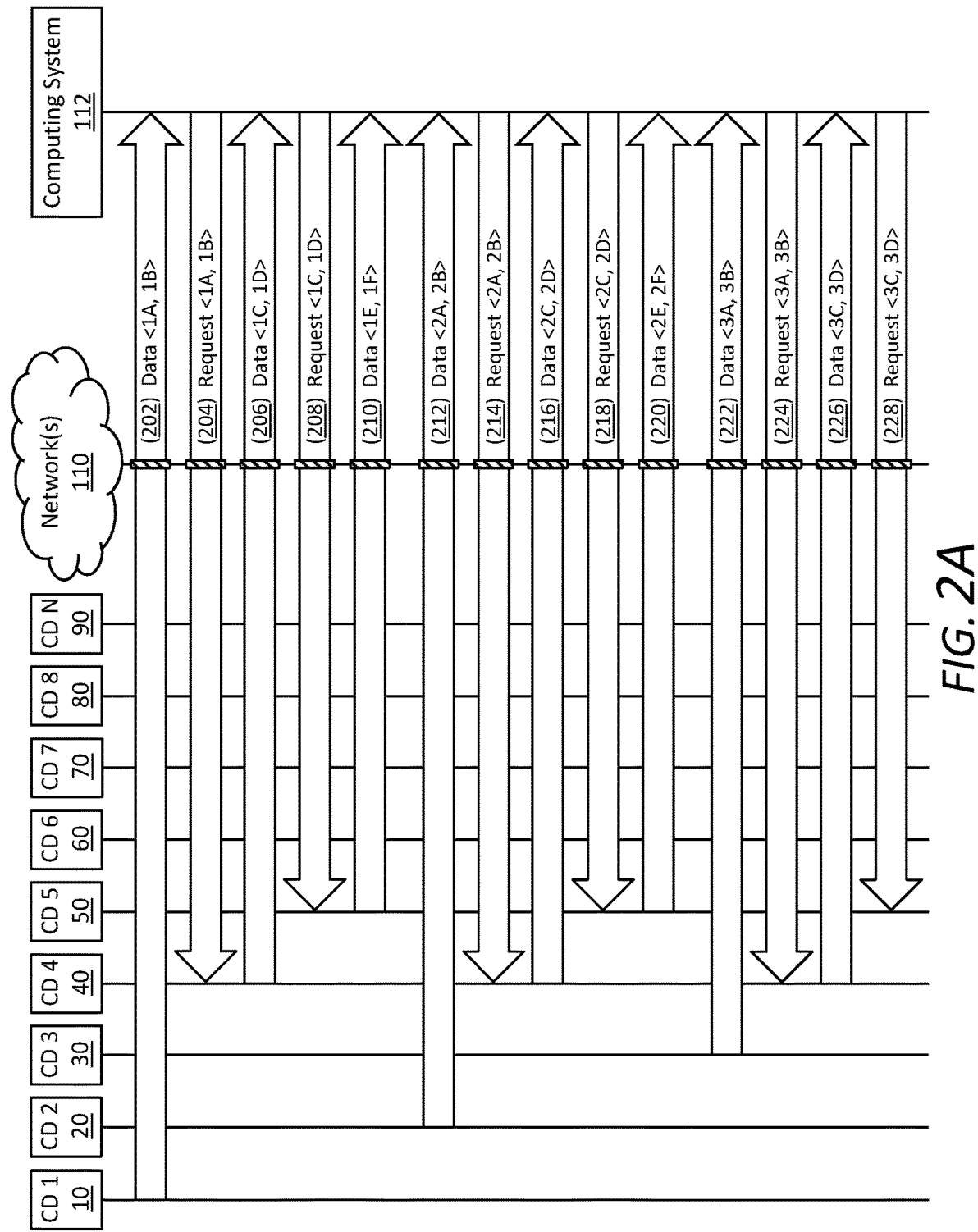
FIGS. 2A-E depict an example event sequence according to example embodiments of the present disclosure.

FIGS. 2A-E depict an example event sequence according to example embodiments of the present disclosure. Referring to FIG. 2A, at (202), computing device 10 can generate data describing (e.g., via elements 1A, 1B, and/or the like) one or more aspects of an entity (e.g., an entity associated with computing device 10, and/or the like). For example, computing device 10 can be associated with an organization, and the data can describe one or more aspects of a job listing for the organization. Computing device 10 can communicate (e.g., via network(s) 110, as indicated by the cross-hatched box over the line extending downward from network(s) 110) the data to computing system 112, which can receive the data.

In some embodiments, computing system 112 can generate data describing one or more interfaces for configuring one or more settings (e.g., privacy settings, and/or the like) associated with the data describing the aspect(s) of the entity, one or more additional aspects of the entity determined by computing system 112, one or more metrics determined by computing system 112 with respect to the entity, and/or the like. Computing system 112 can communicate the data describing the interface(s) to computing device 10; receive, from computing device 10, data indicating the setting(s) (e.g., data generated by a user invoking one or more elements of the interface(s), and/or the like); configure data associated with the entity in accordance with the setting(s); and/or the like. Such configuration can be performed by the entity associated with computing device 10, another entity at the request of the entity associated with computing device 10, and/or the like. For example, referring to FIG. 3A, interface 302 can be utilized by the entity associated with computing device 10 to configure such setting(s). As illustrated, interface 302 can include one or more elements for configuring which types of data can be utilized with respect to various different types of users. The element(s) can be utilized to control, which users, for example, users within the organization associated with computing device 10, users associated with one or more other similar type entities registered with computing system 112 (e.g., other organizations associated with job listings submitted to computing system 112, and/or the like), users associated with one or more other types of entities registered with computing system 112 (e.g., job applicants, and/or the like), and/or users without a given relationship with computing system 112 (e.g., public users, and/or the like) can utilize data associated with the data describing the aspect(s) of the entity (e.g., the job listing, and/or the like), one or more additional aspects of the entity determined by computing system 112 based on such data (e.g., aspects determined based on the job listing, and/or the like), and/or one or more metrics determined by computing system 112 with respect to the entity (e.g., based on the data describing the aspect(s) of the entity, the determined additional aspect(s) of the entity, user activity, and/or the like). It will be appreciated that numerous permutations of such setting(s) are possible, for example, based on various different user configurations.

Returning to FIG. 2A, at (204), computing system 112 can generate a request for additional data associated with the entity. For example, the data received from computing device 10 can include an element (e.g., element 1A, and/or the like) indicating the name of the organization and an element (e.g., element 1B, and/or the like) indicating the name of a hiring manager associated with the job listing, and computing system 112 can utilize one or more of the elements included in the data received from computing device 10 (e.g., elements 1A, 1B, and/or the like) to generate a request for additional data associated with the job listing. In some embodiments, computing system 112 can generate the request based on a predetermined template. Additionally or alternatively, computing system 112 can generate the request based on one or more indicators included in the data received from computing device 10. For example, the data received from computing device 10 can identify the organization associated with computing device 10 (e.g., an organization associated with the job listing, and/or the like), computing system 112 can determine (e.g., based on the data identifying the organization, and/or the like) an additional aspect of the entity (e.g., that a publicly traded share price associated with the organization is currently trading at a reduced price, and/or the like), and computing system 112 can generate a request to identify one or more additional aspects of the entity related to the determined aspect(s) (e.g., whether a layoff is associated with the decreasing share price, and/or the like). Such determined aspect(s) can affect the metric(s) described herein (e.g., an identified layoff could impact a reputational prominence of the entity, an extent to which the entity corresponds with another type of entity (e.g., job applicant, and/or the like)). In some embodiments, computing system 112 can utilize a machine-learning model to generate the request. In some of such embodiments, the machine-learning model can be based at least in part on a feedback loop, for example, associated with one or more ultimate actions (e.g., selection of one or more search results, recommendations, and/or the like) of users of computing system 112 (e.g., organizations associated with job listings, job applicants, and/or the like).

Computing system 112 can communicate the request to computing device 40, which can receive the request. Responsive to receiving the request, at (206), computing device 40 can utilize data included in the request (e.g., elements 1A, 1B, and/or the like) to retrieve data associated with the entity. For example, computing device 40 can be associated with an organization (e.g., a news organization, a financial services organization, and/or the like), store data (e.g., biographical information about organizations' management, and/or the like) that includes a portion of the data included in the request (e.g., elements 1A, 1B, and/or the like), and can utilize the portion of the data included in the request to retrieve data describing (e.g., via elements 1C, 1D, and/or the like) one or more additional aspects of the entity, for example, the name of the hiring manager associated with the job listing. Computing device 40 can communicate the data describing the additional aspect(s) of the entity to computing system 112, which can receive the data and utilize the data to determine the additional aspect(s) of the entity.

At (208), computing system 112 can generate a request for additional data associated with the entity. For example, computing system 112 can utilize one or more of the elements included in the data received from computing device 40 (e.g., elements 1C, 1D, and/or the like) to generate a request for additional data associated with the job listing. Computing system 112 can communicate the request to computing device 50, which can receive the request. Responsive to receiving the request, at (210), computing device 50 can utilize data included in the request (e.g., elements 1C, 1D, and/or the like) to retrieve data associated with the entity. For example, computing device 50 can be associated with an organization (e.g., a trade association, professional association, and/or the like), store data (e.g., professional networking information, and/or the like) that includes a portion of the data included in the request (e.g., elements 1C, 1D, and/or the like), and can utilize the portion of the data included in the request to retrieve data describing (e.g., via elements 1E, 1F, and/or the like) one or more additional aspects of the entity, for example, the name of an organization at which the hiring manager was previously employed. Computing device 50 can communicate the data describing the additional aspect(s) of the entity to computing system 112, which can receive the data and utilize the data to determine the additional aspect(s) of the entity.

At (212), computing device 20 can generate data describing (e.g., via elements 2A, 2B, and/or the like) one or more aspects of an entity (e.g., an entity associated with computing device 20, and/or the like). For example, computing device 20 can be associated with an organization similar to the organization associated with computing device 10, and the data can describe one or more aspects of a job listing for the organization. Computing device 20 can communicate the data to computing system 112, which can receive the data.

At (214), computing system 112 can generate a request for additional data associated with the entity. For example, the data received from computing device 20 can include an element (e.g., element 2A, and/or the like) indicating the name of the organization and an element (e.g., element 2B, and/or the like) indicating the name of a hiring manager associated with the job listing, and computing system 112 can utilize one or more of the elements included in the data received from computing device 20 (e.g., elements 2A, 2B, and/or the like) to generate a request for additional data associated with the job listing. Computing system 112 can communicate the request to computing device 40, which can receive the request. Responsive to receiving the request, at (216), computing device 40 can utilize data included in the request (e.g., elements 2A, 2B, and/or the like) to retrieve data associated with the entity. For example, computing device 40 can store data (e.g., the biographical information about organizations' management, and/or the like) that includes a portion of the data included in the request (e.g., elements 2A, 2B, and/or the like), and computing device 40 can utilize the portion of the data included in the request to retrieve data describing (e.g., via elements 2C, 2D, and/or the like) one or more additional aspects of the entity, for example, the name of the hiring manager associated with the job listing. Computing device 40 can communicate the data describing the additional aspect(s) of the entity to computing system 112, which can receive the data and utilize the data to determine the additional aspect(s) of the entity.

At (218), computing system 112 can generate a request for additional data associated with the entity. For example, computing system 112 can utilize one or more of the elements included in the data received from computing device 40 (e.g., elements 2C, 2D, and/or the like) to generate a request for additional data associated with the job listing. Computing system 112 can communicate the request to computing device 50, which can receive the request. Responsive to receiving, at (220), computing device 50 can utilize data included in the request (e.g., elements 2C, 2D, and/or the like) to retrieve data associated with the entity. For example, computing device 50 can store data (e.g., the professional networking information, and/or the like) that includes a portion of the data included in the request (e.g., elements 2C, 2D, and/or the like), and computing device 50 can utilize the portion of the data included in the request to retrieve data describing (e.g., via elements 2E, 2F, and/or the like) one or more additional aspects of the entity, for example, the name of an organization at which the hiring manager was previously employed. Computing device 50 can communicate the data describing the additional aspect(s) of the entity to computing system 112, which can receive the data and utilize the data to determine the additional aspect(s) of the entity.

At (222), computing device 30 can generate data describing (e.g., via elements 3A, 3B, and/or the like) one or more aspects of an entity (e.g., an entity associated with computing device 30, and/or the like). For example, computing device 30 can be associated with an organization similar to the organizations associated with computing devices 10 and/or 20, and the data can describe one or more aspects of a job listing for the organization. Computing device 30 can communicate the data to computing system 112, which can receive the data.

At (224), computing system 112 can generate a request for additional data associated with the entity. For example, the data received from computing device 30 can include an element (e.g., element 3A, and/or the like) indicating the name of the organization and an element (e.g., element 3B, and/or the like) indicating the name of a hiring manager associated with the job listing, and computing system 112 can utilize one or more of the elements included in the data received from computing device 30 (e.g., elements 3A, 3B, and/or the like) to generate a request for additional data associated with the job listing. Computing system 112 can communicate the request to computing device 40, which can receive the request. Responsive to receiving the request, at (226), computing device 40 can utilize data included in the request (e.g., elements 3A, 3B, and/or the like) to retrieve data associated with the entity. For example, computing device 40 can store data (e.g., the biographical information about organizations' management, and/or the like) that includes a portion of the data included in the request (e.g., elements 3A, 3B, and/or the like), and computing device 40 can utilize the portion of the data included in the request to retrieve data describing (e.g., via elements 3C, 3D, and/or the like) one or more additional aspects of the entity, for example, the name of the hiring manager associated with the job listing. Computing device 40 can communicate the data describing the additional aspect(s) of the entity to computing system 112, which can receive the data and utilize the data to determine the additional aspect(s) of the entity.

Figure 2B:
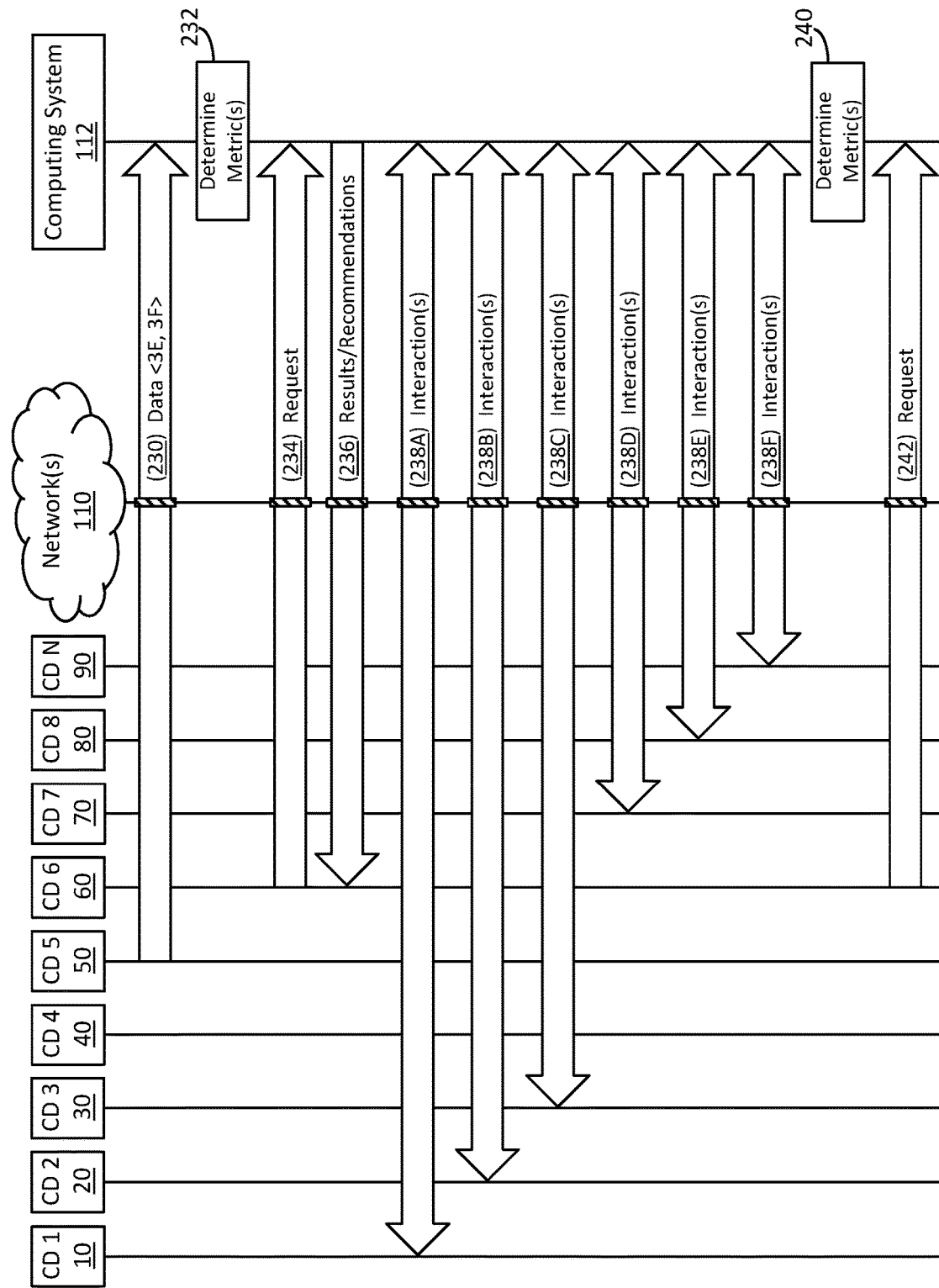

At (228), computing system 112 can generate a request for additional data associated with the entity. For example, computing system 112 can utilize one or more of the elements included in the data received from computing device 40 (e.g., elements 3C, 3D, and/or the like) to generate a request for additional data associated with the job listing. Computing system 112 can communicate the request to computing device 50, which can receive the request. Referring to FIG. 2B, responsive to receiving the request, at (230), computing device 50 can utilize data included in the request (e.g., elements 3C, 3D, and/or the like) to retrieve data associated with the entity. For example, computing device 50 can store data (e.g., the professional networking information, and/or the like) that includes a portion of the data included in the request (e.g., elements 3C, 3D, and/or the like), and computing device 50 can utilize the portion of the data included in the request to retrieve data describing (e.g., via elements 3E, 3F, and/or the like) one or more additional aspects of the entity, for example, the name of an organization at which the hiring manager was previously employed. Computing device 50 can communicate the data describing the additional aspect(s) of the entity to computing system 112, which can receive the data and utilize the data to determine the additional aspect(s) of the entity.

At (232), computing system 112 can determine (e.g., based on the determined aspect(s) of the entities, and/or the like) one or more metrics indicating reputational prominence of one or more of the entities relative to the other entities. For example, for each of the entities (e.g., the organizations, job listings, and/or the like) associated with computing devices 10, 20, and/or 30, computing system 112 can determine a metric indicating a reputational prominence of the entity relative to the other entities. For example, computing system 112 can determine (e.g., based on reputations of the organizations at which the hiring managers were previously employed, and/or the like) relative reputational prominence of the job listings with respect to one another, and/or the like.

At (234), computing device 60 can generate a request (e.g., based on search criteria provided by a user, and/or the like) for search results, recommendations, and/or the like. Computing device 60 can communicate the request to computing system 112, which can receive the request. Responsive to receiving the request, at (236), computing system 112 can generate, based on the determined metric(s), one or more search results, recommendations, and/or the like. In some embodiments, computing system 112 can generate a listing of the search result(s), recommendation(s), and/or the like that is ordered based on the determined metric(s) (e.g., result(s), recommendation(s), and/or the like corresponding to higher relative reputational prominence can be more prominently featured in the listing, and/or the like). Computing system 112 can communicate data indicating the search result(s), recommendation(s), and/or the like (e.g., the listing, and/or the like) to computing device 60 (e.g., for display, and/or the like).

At (238), one or more interactions can occur between the entities, and the interaction(s) can be determined by computing system 112. In some embodiments, the interactions can include one or more click-through rates, for example, associated with one or more users selecting data (e.g. one or more links, and/or the like) corresponding to one or more of the entities. For example, at (238A), computing device 10 can interact with one or more of the job listings. Similarly, at (238B), computing device 20 can interact with one or more of the job listings; and at (238C), computing device 30 can interact with one or more of the job listings. In some embodiments, the interactions can be associated with one or more entities of one type with respect to one or more entities of a different type. For example, computing devices 70, 80, and 90 can be associated with various different job applicants, and at (238D), computing device 70 can interact with one or more of the job listings. Similarly, at (238E), computing device 80 can interact with one or more of the job listings; and at (238F), computing device 90 can interact with one or more of the job listings.

At (240), computing system 112 can determine (e.g., based on the determined aspect(s) of the entities, the determined interaction(s), and/or the like) one or more updated metrics (e.g., indicating reputational prominence of one or more of the entities relative to the other entities, and/or the like). For example, for each of the entities (e.g., the organizations, job listings, and/or the like) associated with computing devices 10, 20, and/or 30, computing system 112 can determine a metric indicating a reputational prominence of the entity relative to the other entities. For example, computing system 112 can determine (e.g., based on reputations of the organizations at which the hiring managers were previously employed, the extent to which job applicants have interacted with the job listings, and/or the like) relative reputational prominence of the job listings with respect to one another, and/or the like.

Figure 2C:
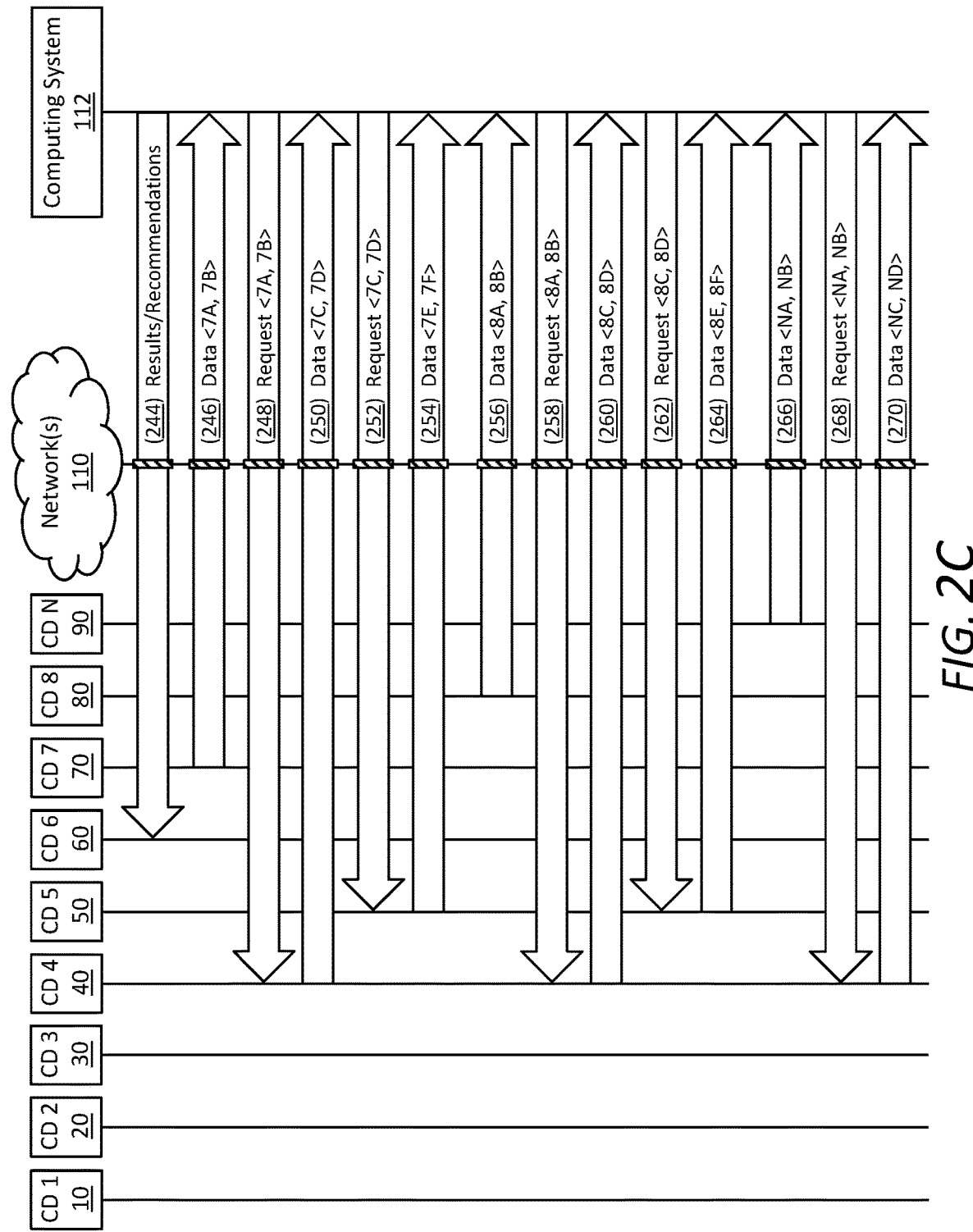

At (242), computing device 60 can generate a request (e.g., based on search criteria provided by a user, and/or the like) for new search results, recommendations, and/or the like. Computing device 60 can communicate the request to computing system 112, which can receive the request. Referring to FIG. 2C, responsive to receiving the request, at (244), computing system 112 can generate, based on the updated metric(s), one or more new search results, recommendations, and/or the like. As indicated above, in some embodiments, computing system 112 can generate a listing of the search result(s), recommendation(s), and/or the like that is ordered based on the metric(s) (e.g., result(s), recommendation(s), and/or the like corresponding to higher relative reputational prominence can be more prominently featured in the listing, and/or the like). Computing system 112 can communicate data indicating the new search result(s), recommendation(s), and/or the like (e.g., the listing, and/or the like) to computing device 60 (e.g., for display, and/or the like).

At (246), computing device 70 can generate data describing (e.g., via elements 7A, 7B, and/or the like) one or more aspects of an entity (e.g., an entity associated with computing device 70, and/or the like). For example, computing device 70 can be associated with a job applicant, and the data can describe one or more aspects of the job applicant. Computing device 70 can communicate the data to computing system 112, which can receive the data.

As indicated above, in some embodiments, computing system 112 can generate data describing one or more interfaces for configuring one or more settings (e.g., privacy settings, and/or the like) associated with the data describing the aspect(s) of the entity, one or more additional aspects of the entity determined by computing system 112, one or more metrics determined by computing system 112 with respect to the entity, and/or the like. Computing system 112 can communicate the data describing the interface(s) to computing device 70; receive, from computing device 70, data indicating the setting(s) (e.g., data generated by a user invoking one or more elements of the interface(s), and/or the like); configure data associated with the entity in accordance with the setting(s); and/or the like. Such configuration can be performed by the entity associated with computing device 70, another entity at the request of the entity associated with computing device 70, and/or the like. For example, referring to FIG. 3B, interface 304 can be utilized by the entity associated with computing device 70 to configure such setting(s). As illustrated, interface 304 can include one or more elements for configuring which types of data can be utilized with respect to various different types of users. The element(s) can be utilized to control, which users, for example, users within an organization associated with computing device 70, users associated with one or more other types of entities registered with computing system 112 (e.g., organizations associated with job listings submitted to computing system 112, and/or the like), users associated with one or more other similar type entities registered with computing system 112, (e.g., other job applicants, and/or the like), and/or users without a given relationship with computing system 112 (e.g., public users, and/or the like) can utilize data associated with the data describing the aspect(s) of the entity (e.g., the job applicant, and/or the like), one or more additional aspects of the entity determined by computing system 112 based on such data (e.g., aspects determined based on the job applicant, and/or the like), and/or one or more metrics determined by computing system 112 with respect to the entity (e.g., based on the data describing the aspect(s) of the entity, the determined additional aspect(s) of the entity, user activity, and/or the like). It will be appreciated that numerous permutations of such setting(s) are possible, for example, based on various different user configurations.

Returning to FIG. 2C, at (248), computing system 112 can generate a request for additional data associated with the entity. For example, the data received from computing device 70 can include an element (e.g., element 7A, and/or the like) indicating the name of the job applicant and an element (e.g., element 7B, and/or the like) indicating the name of an organization at which the job applicant is currently employed, and computing system 112 can utilize one or more of the elements included in the data received from computing device 70 (e.g., elements 7A, 7B, and/or the like) to generate a request for additional data associated with the job applicant. Computing system 112 can communicate the request to computing device 40, which can receive the request. Responsive to receiving the request, at (250), computing device 40 can utilize data included in the request (e.g., elements 7A, 7B, and/or the like) to retrieve data associated with the entity. For example, computing device 40 can store data (e.g., the biographical information about organizations' management, and/or the like) that includes a portion of the data included in the request (e.g., elements 7A, 7B, and/or the like), and computing device 40 can utilize the portion of the data included in the request to retrieve data describing (e.g., via elements 7C, 7D, and/or the like) one or more additional aspects of the entity, for example, the name of the current manager of the job applicant. Computing device 40 can communicate the data describing the additional aspect(s) of the entity to computing system 112, which can receive the data and utilize the data to determine the additional aspect(s) of the entity.

At (252), computing system 112 can generate a request for additional data associated with the entity. For example, computing system 112 can utilize one or more of the elements included in the data received from computing device 40 (e.g., elements 7C, 7D, and/or the like) to generate a request for additional data associated with the job applicant. Computing system 112 can communicate the request to computing device 50, which can receive the request. Responsive to receiving the request, at (254), computing device 50 can utilize data included in the request (e.g., elements 7C, 7D, and/or the like) to retrieve data associated with the entity. For example, computing device 50 can store data (e.g., the professional networking information, and/or the like) that includes a portion of the data included in the request (e.g., elements 7C, 7D, and/or the like), and can utilize the portion of the data included in the request to retrieve data describing (e.g., via elements 7E, 7F, and/or the like) one or more additional aspects of the entity, for example, the name of an organization at which the current manager of the job applicant was previously employed. Computing device 50 can communicate the data describing the additional aspect(s) of the entity to computing system 112, which can receive the data and utilize the data to determine the additional aspect(s) of the entity.

At (256), computing device 80 can generate data describing (e.g., via elements 8A, 8B, and/or the like) one or more aspects of an entity (e.g., an entity associated with computing device 80, and/or the like). For example, computing device 80 can be associated with a job applicant, and the data can describe one or more aspects of the job applicant. Computing device 80 can communicate the data to computing system 112, which can receive the data.

At (258), computing system 112 can generate a request for additional data associated with the entity. For example, the data received from computing device 80 can include an element (e.g., element 8A, and/or the like) indicating the name of the job applicant and an element (e.g., element 8B, and/or the like) indicating the name of an organization at which the job applicant is currently employed, and computing system 112 can utilize one or more of the elements included in the data received from computing device 80 (e.g., elements 8A, 8B, and/or the like) to generate a request for additional data associated with the job applicant. Computing system 112 can communicate the request to computing device 40, which can receive the request. Responsive to receiving the request, at (260), computing device 40 can utilize data included in the request (e.g., elements 8A, 8B, and/or the like) to retrieve data associated with the entity. For example, computing device 40 can store data (e.g., the biographical information about organizations' management, and/or the like) that includes a portion of the data included in the request (e.g., elements 8A, 8B, and/or the like), and computing device 40 can utilize the portion of the data included in the request to retrieve data describing (e.g., via elements 8C, 8D, and/or the like) one or more additional aspects of the entity, for example, the name of the current manager of the job applicant. Computing device 40 can communicate the data describing the additional aspect(s) of the entity to computing system 112, which can receive the data and utilize the data to determine the additional aspect(s) of the entity.

At (262), computing system 112 can generate a request for additional data associated with the entity. For example, computing system 112 can utilize one or more of the elements included in the data received from computing device 40 (e.g., elements 8C, 8D, and/or the like) to generate a request for additional data associated with the job applicant. Computing system 112 can communicate the request to computing device 50, which can receive the request. Responsive to receiving the request, at (264), computing device 50 can utilize data included in the request (e.g., elements 8C, 8D, and/or the like) to retrieve data associated with the entity. For example, computing device 50 can store data (e.g., the professional networking information, and/or the like) that includes a portion of the data included in the request (e.g., elements 8C, 8D, and/or the like), and can utilize the portion of the data included in the request to retrieve data describing (e.g., via elements 8E, 8F, and/or the like) one or more additional aspects of the entity, for example, the name of an organization at which the current manager of the job applicant was previously employed. Computing device 50 can communicate the data describing the additional aspect(s) of the entity to computing system 112, which can receive the data and utilize the data to determine the additional aspect(s) of the entity.

At (266), computing device 90 can generate data describing (e.g., via elements NA, NB, and/or the like) one or more aspects of an entity (e.g., an entity associated with computing device 90, and/or the like). For example, computing device 90 can be associated with a job applicant, and the data can describe one or more aspects of the job applicant. Computing device 90 can communicate the data to computing system 112, which can receive the data.

At (268), computing system 112 can generate a request for additional data associated with the entity. For example, the data received from computing device 90 can include an element (e.g., element NA, and/or the like) indicating the name of the job applicant and an element (e.g., element NB, and/or the like) indicating the name of an organization at which the job applicant is currently employed, and computing system 112 can utilize one or more of the elements included in the data received from computing device 90 (e.g., elements NA, NB, and/or the like) to generate a request for additional data associated with the job applicant. Computing system 112 can communicate the request to computing device 40, which can receive the request. Responsive to receiving the request, at (270), computing device 40 can utilize data included in the request (e.g., elements NA, NB, and/or the like) to retrieve data associated with the entity. For example, computing device 40 can store data (e.g., the biographical information about organizations' management, and/or the like) that includes a portion of the data included in the request (e.g., elements NA, NB, and/or the like), and computing device 40 can utilize the portion of the data included in the request to retrieve data describing (e.g., via elements NC, ND, and/or the like) one or more additional aspects of the entity, for example, the name of the current manager of the job applicant. Computing device 40 can communicate the data describing the additional aspect(s) of the entity to computing system 112, which can receive the data and utilize the data to determine the additional aspect(s) of the entity.

Figure 2D:
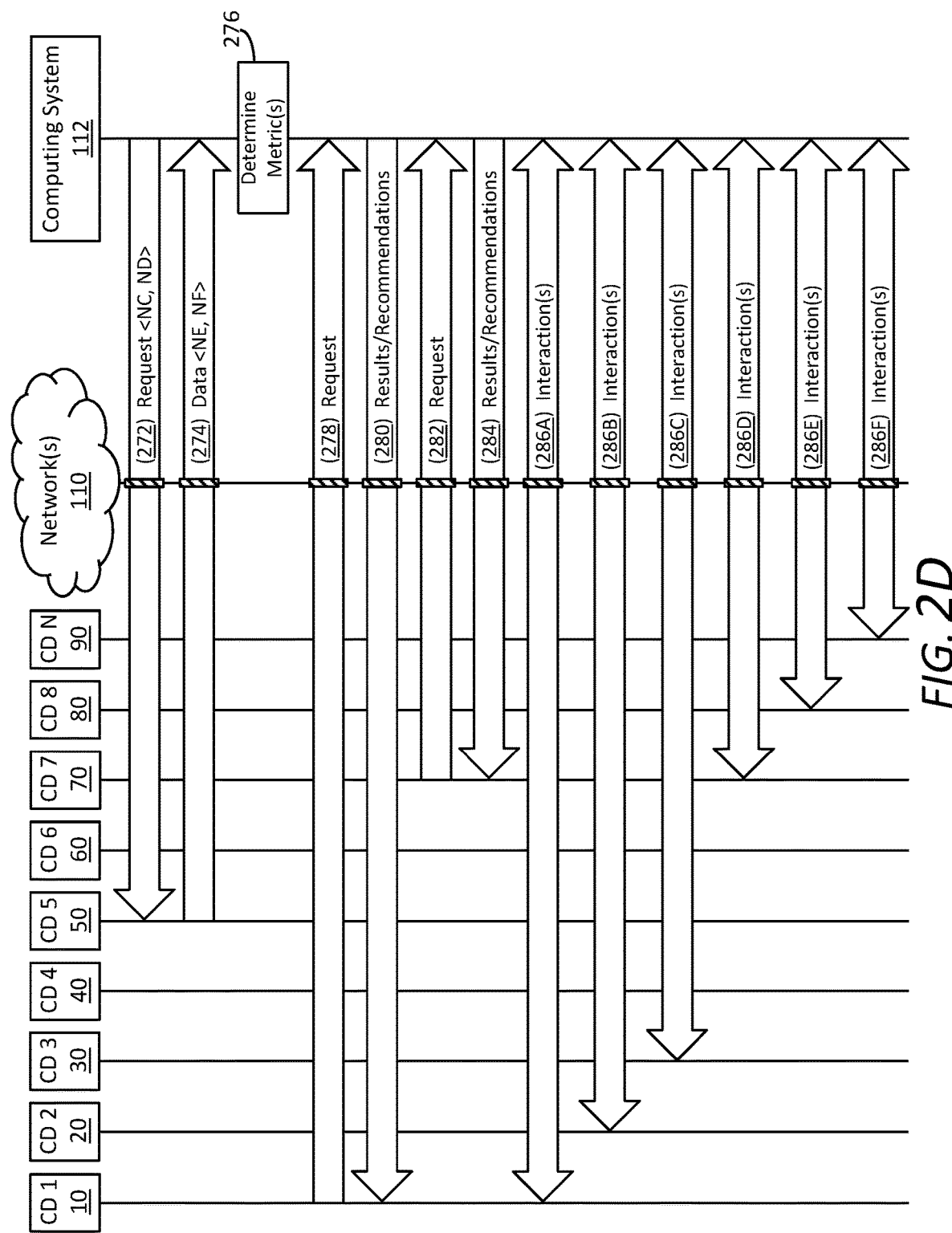

Referring to FIG. 2D, at (272), computing system 112 can generate a request for additional data associated with the entity. For example, computing system 112 can utilize one or more of the elements included in the data received from computing device 40 (e.g., elements NC, ND, and/or the like) to generate a request for additional data associated with the job applicant. Computing system 112 can communicate the request to computing device 50, which can receive the request. Responsive to receiving the request, at (274), computing device 50 can utilize data included in the request (e.g., elements NC, ND, and/or the like) to retrieve data associated with the entity. For example, computing device 50 can store data (e.g., the professional networking information, and/or the like) that includes a portion of the data included in the request (e.g., elements NC, ND, and/or the like), and can utilize the portion of the data included in the request to retrieve data describing (e.g., via elements NE, NF, and/or the like) one or more additional aspects of the entity, for example, the name of an organization at which the current manager of the job applicant was previously employed. Computing device 50 can communicate the data describing the additional aspect(s) of the entity to computing system 112, which can receive the data and utilize the data to determine the additional aspect(s) of the entity.

At (276), computing system 112 can determine (e.g., based on the determined aspect(s) of the entities, and/or the like) one or more metrics indicating reputational prominence of one or more of the entities relative to the other entities. For example, for each of the entities (e.g., the organizations, job listings, and/or the like) associated with computing devices 10, 20, and/or 30, computing system 112 can determine a metric indicating a reputational prominence of the entity relative to the other entities. For example, computing system 112 can determine (e.g., based on reputations of the organizations at which the hiring managers were previously employed, and/or the like) relative reputational prominence of the job listings with respect to one another, and/or the like. Similarly, for each of the entities (e.g., the job applicants, and/or the like) associated with computing devices 70, 80, and/or 90, computing system 112 can determine a metric indicating a reputational prominence of the entity relative to the other entities. For example, computing system 112 can determine (e.g., based on reputations of organizations at which the current managers of the job applicants were previously employed, and/or the like) relative reputational prominence of the job applicants with respect to one another, and/or the like.

Additionally or alternatively, computing system 112 can determine (e.g., based on the determined aspect(s) of the entities, and/or the like) one or more metrics indicating extents to which entities of different types correspond to one another. For example, for each of the entities (e.g., the organizations, job listings, and/or the like) associated with computing devices 10, 20, and/or 30, computing system 112 can determine, for each of the entities (e.g., the job applicants, and/or the like) associated with computing devices 70, 80, and/or 90, a metric indicating an extent to which the entity associated with computing device 10, 20, or 30 (e.g., a job listing, and/or the like) corresponds to the entity associated with computing device 70, 80, or 90 (e.g., a job applicant, and/or the like). Such metric(s) can indicate how appealing the entities are to one another (e.g., a measure of their two-way correspondence, appeal, and/or the like). For example, computing system 112 can determine that an entity associated with computing device 10 and an entity associated with computing device 70 are appealing to one another (e.g., based on matching the organization at which the hiring manager associated with computing device 10 was previously employed with the organization at which the current manager of the job applicant associated with computing device 70 was previously employed, and/or the like). In some embodiments, the metric(s) indicating extents to which entities of different types correspond to one another can be determined based at least in part on one or more of the metric(s) indicating reputational prominence. For example, computing system 112 can determine that an entity (e.g., a job listing, and/or the like) having a high reputational prominence relative to other similar entities (e.g., other job listings, and/or the like) has a strong correspondence with an entity of a different type (e.g., a job applicant, and/or the like) having a similarly high reputational prominence relative to other similar entities (e.g., other job applicants, and/or the like).

In some embodiments, computing system 112 can utilize a machine-learning model to determine the metric(s) indicating extent(s) to which entities of different types correspond to one another. In some of such embodiments, the machine-learning model can be based at least in part on extents to which various different entities of one of the types (e.g., entities associated with one or more of the determined aspect(s) of the entity of that type, and/or the like) have corresponded with various different entities of the other type (e.g., entities associated with one or more of the determined aspect(s) of the entity of the other type, and/or the like).

At (278), computing device 10 can generate a request (e.g., based on search criteria provided by a user, and/or the like) for search results, recommendations, and/or the like. Computing device 10 can communicate the request to computing system 112, which can receive the request. Responsive to receiving the request, at (280), computing system 112 can generate, based on the determined metric(s), one or more search results, recommendations, and/or the like. In some embodiments, computing system 112 can generate a listing of the search result(s), recommendation(s), and/or the like that is ordered based on the determined metric(s) (e.g., result(s), recommendation(s), and/or the like corresponding to higher relative reputational prominence, correspondence with other entities, and/or the like can be more prominently featured in the listing, and/or the like). For example, the listing of search result(s), recommendation(s), and/or the like can identify job applicants (e.g., associated with computing devices 70, 80, and/or 90) ordered based on their reputational prominences, extents to which they correspond with the job listing associated with computing device 10, and/or the like. Computing system 112 can communicate data indicating the search result(s), recommendation(s), and/or the like (e.g., the listing, and/or the like) to computing device 10 (e.g., for display, and/or the like).

At (282), computing device 70 can generate a request (e.g., based on search criteria provided by a user, and/or the like) for search results, recommendations, and/or the like. Computing device 70 can communicate the request to computing system 112, which can receive the request. Responsive to receiving the request, at (284), computing system 112 can generate, based on the determined metric(s), one or more search results, recommendations, and/or the like. As indicated above, in some embodiments, computing system 112 can generate a listing of the search result(s), recommendation(s), and/or the like that is ordered based on the determined metric(s) (e.g., result(s), recommendation(s), and/or the like corresponding to higher relative reputational prominence, correspondence with other entities, and/or the like can be more prominently featured in the listing, and/or the like). For example, the listing of search result(s), recommendation(s), and/or the like can identify job listings (e.g., associated with computing devices 10, 20, and/or 30) ordered based on their reputational prominences, extents to which they correspond with the job applicant associated with computing device 70, and/or the like. Computing system 112 can communicate data indicating the search result(s), recommendation(s), and/or the like (e.g., the listing, and/or the like) to computing device 70 (e.g., for display, and/or the like).

At (286), one or more interactions can occur between the entities, and the interaction(s) can be determined by computing system 112. In some embodiments, the interactions can include one or more click-through rates, for example, associated with one or more users selecting data (e.g. one or more links, and/or the like) corresponding to one or more of the entities. For example, at (286A), computing device 10 can interact with one or more of the job listings, applicants, and/or the like. Similarly, at (286B), computing device 20 can interact with one or more of the job listings, applicants, and/or the like; at (286C), computing device 30 can interact with one or more of the job listings, applicants, and/or the like; at (286D), computing device 70 can interact with one or more of the job listings, applicants, and/or the like; at (286E), computing device 80 can interact with one or more of the job listings, applicants, and/or the like; and at (286F), computing device 90 can interact with one or more of the job listings, applicants, and/or the like.

Figure 2E:
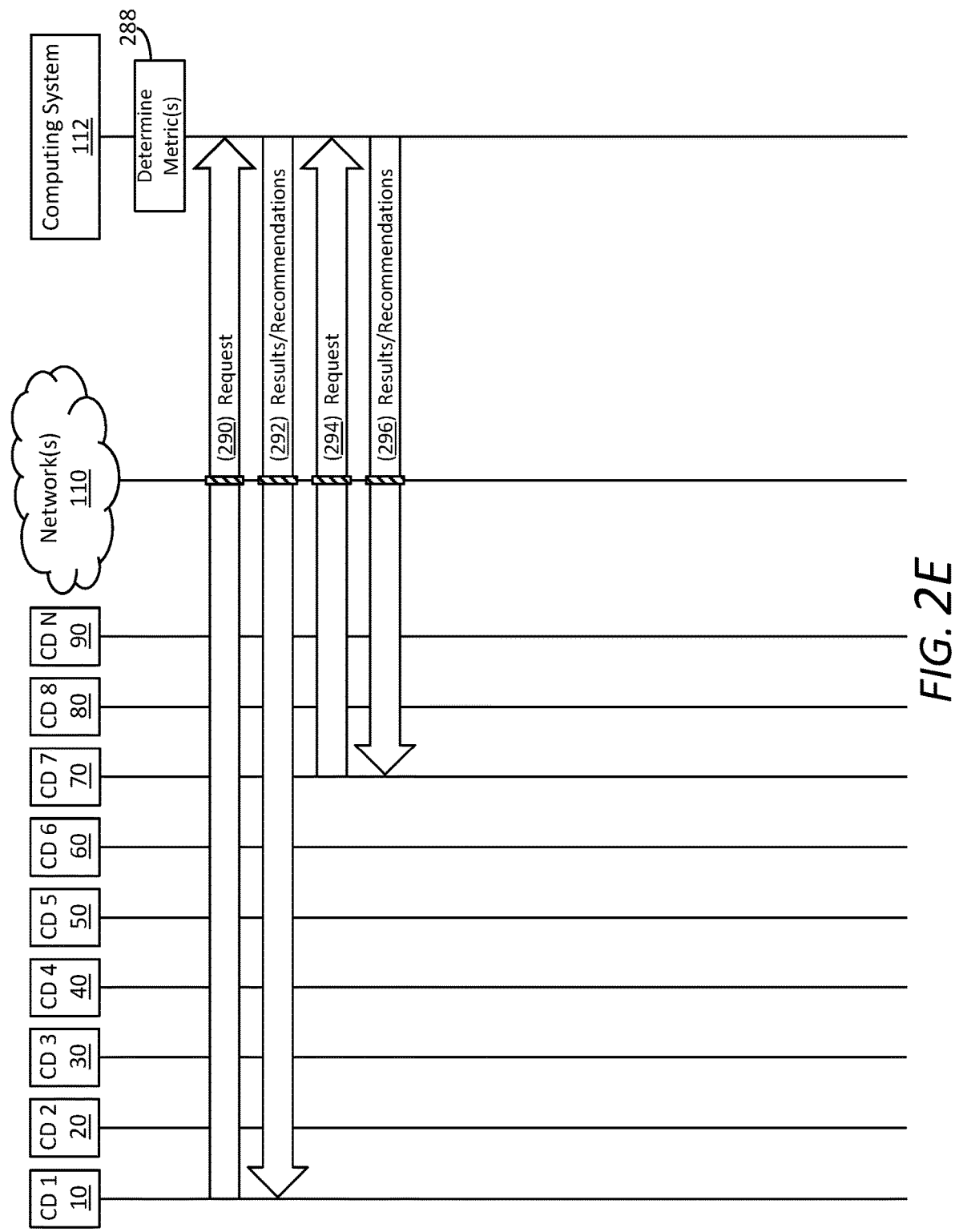

Referring to FIG. 2E, at (288), computing system 112 can determine (e.g., based on the determined aspect(s) of the entities, the determined interaction(s), and/or the like) one or more updated metrics (e.g., indicating reputational prominence of one or more of the entities relative to the other entities, extents to which entities of different types correspond to one another, and/or the like). In some embodiments, computing system 112 can determine one or more of the metric(s) based on frequency of the interaction(s). For example, computing system 112 can determine one or more of the metric(s) based on the number of job applicants that have applied for a given job listing since the listing was made available (e.g., listed, published, and/or the like). Such a determination can be based on a ratio of the number of job applicants that have applied for a given job listing over a number of impressions (e.g., views, and/or the like) of the job listing. The number of impressions can be weighted to reflect likelihood that an impression has truly been exposed to a user. For example, there is a possibility that a job listing can be displayed (e.g., as part of a listing of search results, recommendations, and/or the like) in a manner (e.g., low in the listing, at a less prominent position, and/or the like) that a user is unlikely to be truly exposed to it (e.g., they may be required to scroll to view it, and/or the like). Such weighting can be based on a determined interaction (e.g., click, and/or the like) propensity for one or more similarly displayed job listings. In some embodiments, computing system 112 can determine the metric(s) in order to optimize (e.g., maximize, and/or the like) the relevance of the entities included in the listing, their position within the listing, and/or the like (e.g., to match job applicants with strongly corresponding job listings, job listings with strongly corresponding job applicants, and/or the like) versus doing so to increase, maximize, and/or the like interactions (e.g., click-through rates, and/or the like).

At (290), computing device 10 can generate a request (e.g., based on search criteria provided by a user, and/or the like) for new search results, recommendations, and/or the like. Computing device 10 can communicate the request to computing system 112, which can receive the request. Responsive to receiving the request, at (292), computing system 112 can generate, based on the updated metric(s), one or more new search results, recommendations, and/or the like. Computing system 112 can communicate data indicating the new search result(s), recommendation(s), and/or the like to computing device 10 (e.g., for display, and/or the like).

At (294), computing device 70 can generate a request (e.g., based on search criteria provided by a user, and/or the like) for new search results, recommendations, and/or the like. Computing device 70 can communicate the request to computing system 112, which can receive the request. Responsive to receiving the request, at (296), computing system 112 can generate, based on the updated metric(s), one or more new search results, recommendations, and/or the like. Computing system 112 can communicate data indicating the new search result(s), recommendation(s), and/or the like to computing device 70 (e.g., for display, and/or the like).

Figure 4:
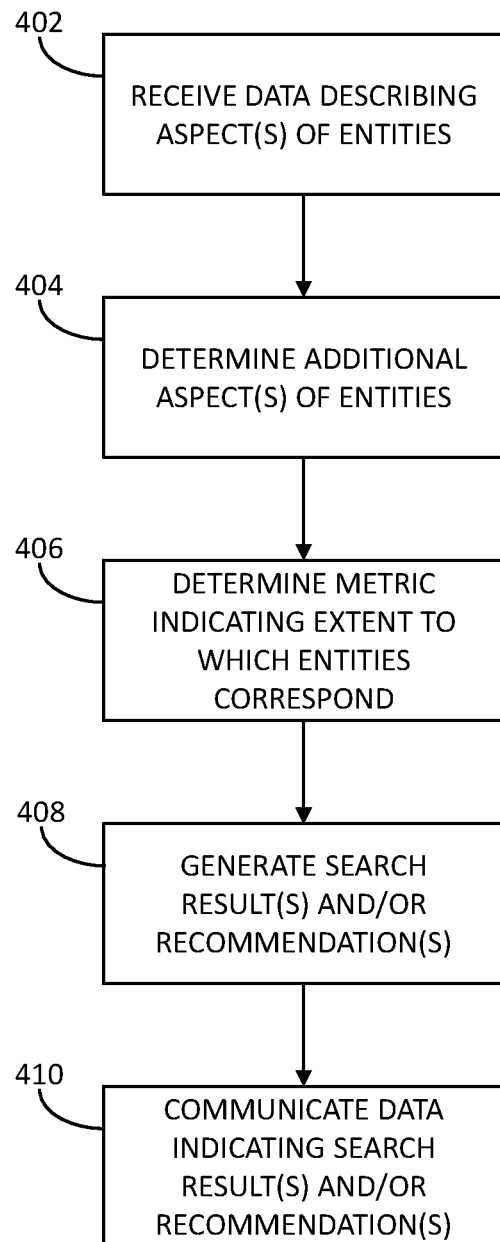
FIGS. 4 and 5 depict example methods according to example embodiments of the present disclosure.
Figure 5:
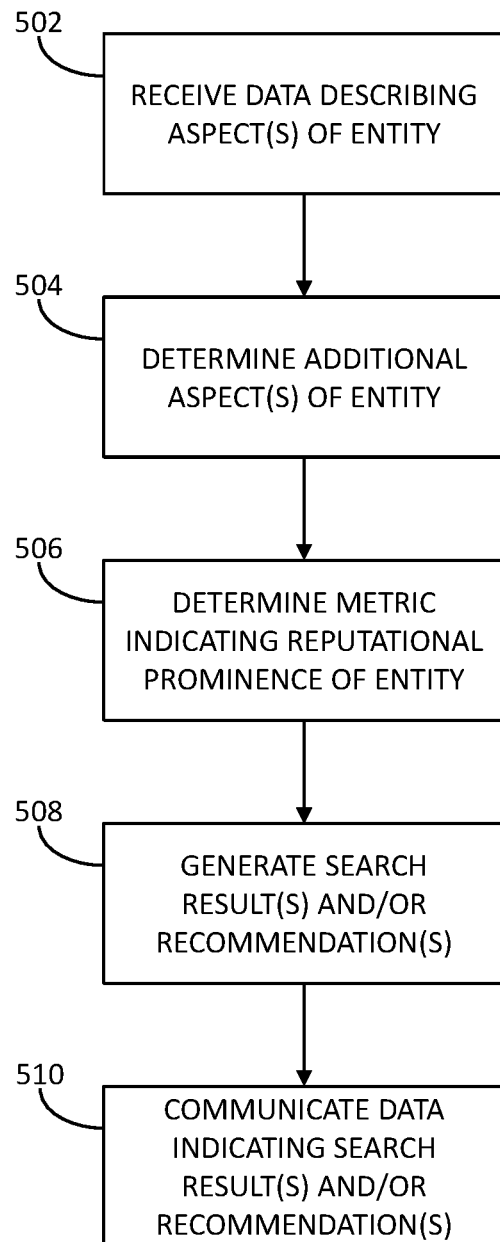

FIGS. 4 and 5 depict example methods according to example embodiments of the present disclosure.

Referring to FIG. 4, at (402), a computing system can receive data describing one or more aspects of entities of different types. For example, computing system 112 can receive data describing one or more aspects of an entity of one type (e.g., a job listing, and/or the like) from computing device 10, and computing system 112 can receive data describing one or more aspects of an entity of another type (e.g., a job applicant, and/or the like) from computing device 70. At (404), the computing system can determine one or more additional aspects of the entities. For example, computing system 112 can determine (e.g., based on data retrieved from computing devices 40 and/or 50, and/or the like): one or more additional aspects of the entity (e.g., the job listing, and/or the like) described by the data received from computing device 10; and one or more additional aspects of the entity (e.g., the job applicant, and/or the like) described by the data received from computing device 70. At (406), the computing system can determine a metric indicating an extent to which the entities correspond to one another. For example, computing system 112 can determine (e.g., based on the determined aspect(s), and/or the like) a metric indicating an extent to which the entity (e.g., the job listing, and/or the like) described by the data received from computing device 10 and the entity (e.g., the job applicant, and/or the like) described by the data received from computing device 70 correspond to one another.

In some embodiments, the metric can indicate an extent to which the entity (e.g., the job listing, and/or the like) described by the data received from computing device 10 and the entity (e.g., the job applicant, and/or the like) described by the data received from computing device 70 exhibit a two-way correspondence to one another (e.g., mutual appeal, and/or the like). In some of such embodiments, the two-way correspondence can be based on correspondence between one or more implicit dimensions of the entity (e.g., the job listing, and/or the like) described by the data received from computing device 10 and the entity (e.g., the job applicant, and/or the like) described by the data received from computing device 70. The implicit dimension(s) of the entity (e.g., the job listing, and/or the like) described by the data received from computing device 10 can be based on its determined additional aspect(s) and not include aspects described by the data received from computing devices 10, 40, 50, and/or 70. Similarly, the implicit dimension(s) of the entity (e.g., the job applicant, and/or the like) described by the data received from computing device 70 can be based on its determined additional aspect(s) and not include aspects described by the data received from computing devices 10, 40, 50, and/or 70. In some embodiments, neither the data received from computing devices 10 and/or 70 nor the data received from computing devices 40 and/or 50 includes the metric indicating the extent to which the entities correspond to one another.

At (408), the computing system can generate, based on the metric, search results, recommendations, and/or the like. For example, computing system 112 can generate, based on the metric indicating the extent to which the entity (e.g., the job listing, and/or the like) described by the data received from computing device 10 and the entity (e.g., the job applicant, and/or the like) described by the data received from computing device 70 correspond to one another, one or more search results, recommendations, and/or the like identifying the entity (e.g., the job applicant, and/or the like) described by the data received from computing device 70. At (410), the computing system can communicate data indicating the search result(s), recommendation(s), and/or the like. For example, computing system 112 can communicate data indicating the search result(s), recommendation(s), and/or the like identifying the entity (e.g., the job applicant, and/or the like) described by the data received from computing device 70 to computing device 10.

Referring to FIG. 5, at (502), a computing system can receive data describing one or more aspects of an entity. For example, computing system 112 can receive data describing one or more aspects of an entity (e.g., a job listing, and/or the like) from computing device 10. At (504), the computing system can determine one or more additional aspects of the entity. For example, computing system 112 can determine (e.g., based on data retrieved from computing devices 40 and/or 50, and/or the like) one or more additional aspects of the entity (e.g., the job listing, and/or the like) described by the data received from computing device 10. At (506), the computing system can determine a metric indicating a reputational prominence of the entity relative to other entities of a similar type. For example, computing system 112 can determine (e.g., based on the determined aspect(s), and/or the like) a metric indicating a reputational prominence of the entity (e.g., the job listing, and/or the like) described by the data received from computing device 10 relative to other entities of a similar type (e.g., job listings described by data received from computing devices 20 and/or 30, and/or the like). In some embodiments, neither the data received from computing device 10 (e.g., describing the aspect(s) of the entity, and/or the like) nor the data received from computing devices 40 and/or 50 (e.g., based upon which the additional aspect(s) of the entity are determined, and/or the like) includes the metric indicating the reputational prominence of the entity.

At (508), the computing system can generate, based on the metric, search results, recommendations, and/or the like. For example, computing system 112 can generate, based on the metric indicating the reputational prominence of the entity (e.g., the job listing, and/or the like) described by the data received from computing device 10, one or more search results, recommendations, and/or the like identifying the entity (e.g., the job listing, and/or the like) described by the data received from computing device 10. At (510), the computing system can communicate data indicating the search result(s), recommendation(s), and/or the like. For example, computing system 112 can communicate data indicating the search result(s), recommendation(s), and/or the like identifying the entity (e.g., the job listing, and/or the like) described by the data received from computing device 10 to computing device 70 (e.g., for display, and/or the like).

The technology discussed herein makes reference to servers, databases, software applications, and/or other computer-based systems, as well as actions taken and information sent to and/or from such systems. The inherent flexibility of computer-based systems allows for a great variety of possible configurations, combinations, and/or divisions of tasks and/or functionality between and/or among components. For instance, processes discussed herein can be implemented using a single device or component and/or multiple devices or components working in combination. Databases and/or applications can be implemented on a single system and/or distributed across multiple systems. Distributed components can operate sequentially and/or in parallel.

Various connections between elements are discussed in the above description. These connections are general and, unless specified otherwise, can be direct and/or indirect, wired and/or wireless. In this respect, the specification is not intended to be limiting.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to more effectively implement one or more aspects of the disclosure, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method comprising:
   receiving, by a computing system and from a computing device associated with an entity of a first type, data describing one or more aspects of the entity of the first type;
   receiving, by the computing system and from a computing device associated with an entity of a second type, data describing one or more aspects of the entity of the second type, the first type being different from the second type, the entity of the first type seeking entities of the second type, and the entity of the second type seeking entities of the first type;
   determining, by the computing system and based at least in part on the one or more aspects of the entity of the first type and data associated with the entity of the first type and retrieved from a computing device distinct from the computing device associated with the entity of the first type, one or more additional aspects of the entity of the first type;

determining, by the computing system and based at least in part on the one or more aspects of the entity of the second type and data associated with the entity of the second type and retrieved from a computing device distinct from the computing device associated with the entity of the second type, one or more additional aspects of the entity of the second type;

determining, by the computing system and based at last in part on the one or more additional aspects of the entity of the first type and the one or more additional aspects of the entity of the second type, a metric indicating an extent to which the entity of the first type and the entity of the second type exhibit a two-way correspondence to one another based on correspondence between one or more implicit dimensions of the entity of the first type and one or more implicit dimensions of the entity of the second type, the one or more implicit dimensions of the entity of the first type being based on the one or more additional aspects of the entity of the first type, the one or more implicit dimensions of the entity of the second type being based on the one or more additional aspects of the entity of the second type, wherein the metric indicates how appealing the second type is to the entity of the first type and how appealing the first type is to the entity of the second type;

generating, by the computing system and based at least in part on the metric, one or more of search results or recommendations identifying the entity of the first type; and communicating, by the computing system and to the computing device associated with the entity of the second type, data indicating the one or more of the search results or the recommendations.

2. The computer-implemented method of claim 1, wherein:
the entity of the first type comprises either a job applicant or a job listing; and
the entity of the second type comprises the other of the job applicant or the job listing.

3. The computer-implemented method of claim 1, wherein:
the entity of the first type comprises either a prospective buyer or a real-estate listing; and
the entity of the second type comprises the other of the prospective buyer or the real-estate listing.

4. The computer-implemented method of claim 1, wherein:
the entity of the first type comprises either a prospective client or a professional-service provider; and
the entity of the second type comprises the other of the prospective client or the professional-service provider.

5. The computer-implemented method of claim 1, wherein:
determining the one or more additional aspects of the entity of the first type comprises utilizing an element included in the data describing the one or more aspects of the entity of the first type to identify, in the data associated with the entity of the first type and retrieved from the computing device distinct from the computing device associated with the entity of the first type, data indicating at least one aspect of the one or more additional aspects of the entity of the first type; and determining the metric comprises determining the metric based at least in part on the at least one aspect of the one or more additional aspects of the entity of the first type.

6. The computer-implemented method of claim 5, wherein:
determining the one or more additional aspects of the entity of the first type comprises utilizing the element included in the data indicating the at least one aspect of the one or more additional aspects of the entity of the first type to identify, in data associated with the entity of the first type and retrieved from a different computing device distinct from the computing device associated with the entity of the first type, data indicating at least one additional aspect of the one or more additional aspects of the entity of the first type; and determining the metric comprises determining the metric based at least in part on the at least one additional aspect of the one or more additional aspects of the entity of the first type.

7. The computer-implemented method of claim 1, wherein:
determining the one or more additional aspects of the entity of the first type comprises utilizing an element included in the data describing the one or more aspects of the entity of the first type to identify, in the data associated with the entity of the first type and retrieved from the computing device distinct from the computing device associated with the entity of the first type, data indicating one or more interactions between the entity of the first type with one or more other entities of the second type; and determining the metric comprises determining the metric based at least in part on the one or more interactions between the entity of the first type with the one or more other entities of the second type.

8. The computer-implemented method of claim 1, comprising:
determining, by the computing system, one or more interactions between one or more other entities of the second type with the entity of the first type that occurred subsequent to determining the metric;

determining, by the computing system and based at least in part on the one or more interactions, an updated metric indicating an extent to which the entity of the first type and the entity of the second type correspond to one another in light of the one or more interactions;

generating, by the computing system and based at least in part on the updated metric, one or more of new search results or new recommendations identifying the entity of the first type; and communicating, by the computing system and to the computing device associated with the entity of the second type, data indicating the one or more of the new search results or the new recommendations.

9. The computer-implemented method of claim 8, wherein:
determining the one or more interactions comprises determining a click-through rate associated with the one or more other entities of the second type with respect to the entity of the first type; and determining the updated metric comprises determining the updated metric based at least in part on the click-through rate.

10. The computer-implemented method of claim 1, wherein determining the metric comprises utilizing a machine-learning model based at least in part on extents to which different entities of the first type associated with at least one of the one or more additional aspects of the entity of the first type have corresponded with different entities of the second type associated with at least one of the one or more additional aspects of the entity of the second type.

11. The computer-implemented method of claim 1, comprising determining, by the computing system, a plurality of metrics indicating extents to which the entity of the second type corresponds with a plurality of different entities of the first type.

12. The computer-implemented method of claim 11, wherein generating the one or more of the search results or the recommendations comprises generating a listing of the one or more of the search results or the recommendations identifying the plurality of different entities of the first type and ordered based at least in part on the plurality of metrics.

13. The computer-implemented method of claim 1, wherein:
the method comprises determining, by the computing system and based at least in part on the one or more additional aspects of the entity of the first type, a metric indicating a reputational prominence of the entity of the first type relative to a plurality of other entities of the first type; and
determining the metric indicating the extent to which the entity of the first type and the entity of the second type correspond to one another comprises determining the metric indicating the extent to which the entity of the first type and the entity of the second type correspond to one another based at least in part on the metric indicating the reputational prominence of the entity of the first type relative to the plurality of other entities of the first type.

14. A system comprising:
one or more processors; and
a memory storing instructions that when executed by the one or more processors cause the system to perform operations comprising:
receiving, from a computing device associated with an entity of a first type, data describing one or more aspects of the entity of the first type;
determining, based at least in part on the one or more aspects of the entity of the first type and data associated with the entity of the first type and retrieved from a computing device distinct from the computing device associated with the entity of the first type, one or more additional aspects of the entity of the first type;
determining, based at last in part on the one or more additional aspects of the entity of the first type, a plurality of metrics indicating extents to which the entity of the first type corresponds with a plurality of different entities of a second type, wherein the plurality of metrics indicates how appealing the second type is to the entity of the first type and how appealing the first time is to the plurality of different entities of the second type;
generating a listing of one or more of search results or recommendations identifying the plurality of different entities of the second type and ordered based at least in part on the plurality of metrics; and
communicating, to the computing device associated with the entity of the first type, data indicating the listing.

15. The system of claim 14, wherein determining the plurality of metrics comprises utilizing a machine-learning model based at least in part on extents to which different entities of the first type associated with at least one of the one or more additional aspects of the entity of the first type have corresponded with various different entities of the second type.

16. The system of claim 14, wherein the operations comprise:
determining one or more interactions between the entity of the first type and one or more of the plurality of entities of the second type that occurred subsequent to determining the plurality of metrics;
determining, based at least in part on the one or more interactions, a plurality of updated metrics indicating extents to which the entity of the first type corresponds with the plurality of different entities of the second type in light of the one or more interactions;
generating a new listing of one or more of search results or recommendations identifying the plurality of different entities of the second type and ordered based at least in part on the plurality of updated metrics; and
communicating, to the computing device associated with the entity of the first type, data indicating the new listing.

17. One or more non-transitory computer-readable media comprising instructions that when executed by one or more computers cause the one or more computers to perform operations comprising:
for each entity of a first type of a plurality of different entities of a first type:
receiving, from a computing device associated with the entity of the first type, data describing one or more aspects of the entity of the first type;
determining, based at least in part on the one or more aspects of the entity of the first type and data associated with the entity of the first type and retrieved from a computing device distinct from the computing device associated with the entity of the first type, one or more additional aspects of the entity of the first type;
determining, based at last in part on the one or more additional aspects of the entity of the first type, a plurality of metrics indicating extents to which the entity of the first type corresponds with a plurality of different entities of a second type, wherein the plurality of metrics indicates how appealing the second type is to the entity of the first type and how appealing the first type is to the plurality of different entities of the second type;
generating, based at least in part on the plurality of metrics, one or more of search results or recommendations identifying the plurality of different entities of the second type; and
communicating, to the computing device associated with the entity of the first type, data indicating the one or more of the search results or the recommendations.

18. The one or more non-transitory computer-readable media of claim 17, wherein determining the plurality of metrics comprises utilizing a machine-learning model based at least in part on extents to which different entities of the first type associated with at least one of the one or more additional aspects of the entity of the first type have corresponded with various different entities of the second type.

19. The one or more non-transitory computer-readable media of claim 17, wherein:
generating the one or more of the search results or the recommendations comprises generating a listing of the one or more of the search results or the recommendations ordered based at least in part on the plurality of metrics; and
communicating the data comprises communicating data indicating the listing.

\* \* \* \* \*